Figure 1:
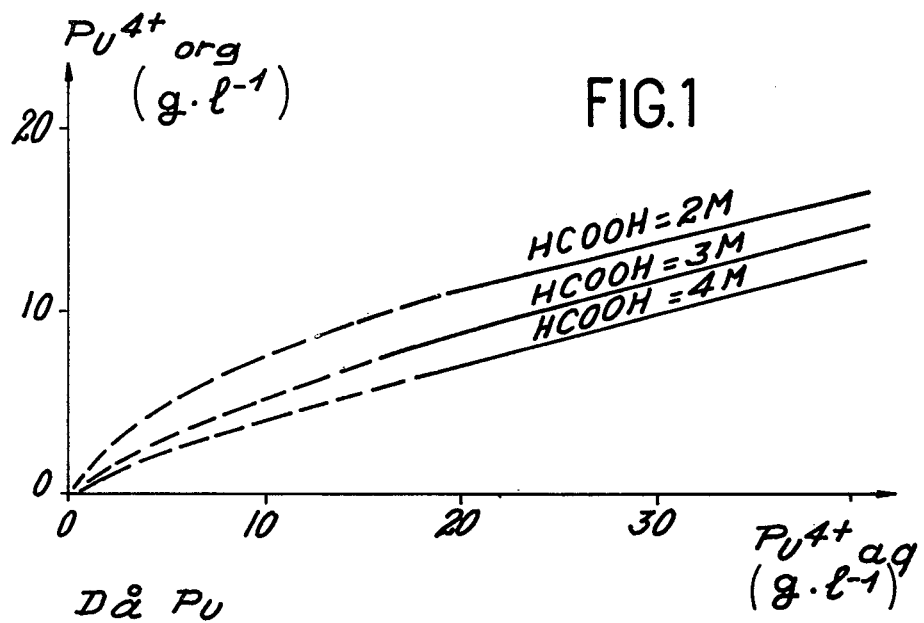

United States Patent [19]
Bathellier et al.

[11] 3,981,961
[45] Sept. 21, 1976

[54] METHOD OF SELECTIVE STRIPPING OF PLUTONIUM FROM ORGANIC SOLVENTS LOADED WITH PLUTONIUM

[75] Inventors: André Bathellier, Sceaux; Michel Germain, Marcoussis, both of France

[73] Assignee: Commissariat a l'Energie Atomique, Paris, France

[22] Filed: Dec. 21, 1973

[21] Appl. No.: 427,349

[30] Foreign Application Priority Data

Dec. 28, 1972 France .............................. 72.46655

[52] U.S. Cl. ........................................ 423/9; 423/8; 423/10; 252/301.1 R
[51] Int. Cl.$^2$ ........................................ B01D 11/00
[58] Field of Search .................. 252/301.1 R; 423/8, 423/9, 10

[56] References Cited
UNITED STATES PATENTS
3,343,925   9/1967   Bathellier .............................. 423/10

Primary Examiner—Stephen J. Lechert, Jr.
Attorney, Agent, or Firm—Lane, Aitken, Dunner & Ziems

[57] ABSTRACT

The method of selective stripping from plutonium-loaded organic solvents which may also contain uranium consists in passing the organic solvent in countercurrent contact with an aqueous solution of a salt of hydroxylamine and formic acid, the concentration of formic acid in the reaction medium being within the range of 1M to 5M.

The method finds an application in the stripping of plutonium from trilaurylamine diluted in an aromatic hydrocarbon such as tert-butyl benzene or in the separation of uranium and plutonium contained in tributylphosphate diluted in an aliphatic hydrocarbon such as dodecane.

8 Claims, 6 Drawing Figures

METHOD OF SELECTIVE STRIPPING OF PLUTONIUM FROM ORGANIC SOLVENTS LOADED WITH PLUTONIUM

This invention relates to a method of selective stripping of plutonium from organic solvents loaded with plutonium and in some cases with uranium.

It is known that, in nuclear-fuel reprocessing which is usually accomplished by extraction from nitric acid solutions, the problem of stripping of plutonium is presented differently according to the nature of the extraction solvent employed.

In fact, both anion exchangers and tertiary amines have a very strong affinity for Pu(IV) and a very weak affinity for U(VI). The solvent in such cases is consequently loaded with plutonium alone. On the other hand the neutral solvents such as tributylphosphate extract the nitrates of the hexavalent and tetravalent actinides simultaneously. The solvent in this case is consequently loaded both with plutonium and with uranium and there then arises the problem of separating these two substances which are present in this particular solvent.

A large number of methods have already been tried for stripping plutonium from the organic solvents mentioned above. They are based either on reduction of Pu(IV) to Pu(III) in which case the Pu(III) passes into the aqueous phase, or on complexing of the plutonium in which case the inextractable complex formed passes into the aqueous phase, or on displacement of the plutonium which consists in loading the solvent with a more readily extractable substance than plutonium and therefore in transferring the plutonium to the aqueous phase.

For example in regard to plutonium-loaded trilaurylamine, the methods of the prior art which are worthy of mention are complexing and displacement of plutonium or reduction from Pu (IV) to PU (III).

Complexing and displacement of plutonium from trilaurylamine can thus be carried out as follows:

by sulphuric acid: this method has a disadvantage in that it entails the use of a corrosive reagent which it is impossible to eliminate in a simple manner and results in slight contamination of the resultant $PuO_2$ by the $SO_4^{--}$ ions, by the carboxylic acids such as formic acid, acetic acid, capric acid. Formic acid is less effective than sulphuric acid. Acetic acid has the disadvantage of being highly soluble in solvents. Capric acid has the disadvantage of being solid.

The reduction of the Pu (IV) contained in trilaurylamine to Pu (III) can be carried out:

by nitrous acid in a weakly acid medium. This method is unfortunately conducive to chemical degradation of the trilaurylamine;

by the sulphates of hydrazine and hydroxyalmine. These reducing agents have a disadvantage in that they react too slowly;

by cationic reducing agents such as ferrous iron which it is necessary to remove subsequently. As a rule, this type of reduction is combined with complexing by $SO_4^{--}$, for example.

Selective stripping of plutonium from solvents such as tributylphosphate gives rise to the further problem of uranium-plutonium separation. In fact, stripping of plutonium can be obtained simply by washing with nitric acid diluted with the loaded tributylphosphate but the process is accompanied in that case by at least partial stripping of the uranium.

It has been endeavored to obtain selective stripping of plutonium by reduction of Pu(IV) to Pu(III) by ferrous sulphamate or uranous uranium. These reducing agents are stabilized as well as the Pu(III) which is formed by addition of hydroxylamine or hydrazine. The use of ferrous sulphamate has the disadvantage of introducing sulphate ions into the solutions and of contaminating the plutonium with iron. The use of uranous uranium is of interest only in the case in which a mixture of uranium and plutonium is found to contain a high proportion of uranium with respect to plutonium. In addition, a further problem is created by the necessary presence of a reagent for $U^{4+}$ having the same isotopic composition as the uranium of the starting fuel.

In order to strip the plutonium from tributylphosphate which is loaded both with uranium and plutonium, an attempt has also been made to carry out reduction by hydroxylamine nitrate. However, the mixer-settler which is employed in this case must have an extremely large number of stages and the stripping efficiency is poor.

Another method of the prior art for stripping plutonium from tributylphosphate loaded with uranium and plutonium is the method of complexing by sulphuric acid. Complexing by $H_2SO_4$ can be combined with reduction by ferrous ions but contaminants ($Fe^{++}$ and $SO_4^{--}$) which are difficult or impossible to eliminate are found to be present in this case.

The method according to the invention overcomes the disadvantages recalled in the foregoing, especially insofar as it provides a simple and easy means of obtaining selective stripping of plutonium without attendant formation of impurities which are both objectionable and difficult to eliminate. This method is particularly attractive whenever it is desired to strip plutonium from a solvent which is loaded both with uranium and plutonium and permits good uranium-plutonium separation in this case.

The method under consideration is distinguished by the fact that the stripping process is carried out by countercurrent contacting of the organic solvent with an aqueous solution of a salt of hydroxylamine and formic acid, the concentration of the formic acid in the reaction medium being within the range of 1 M and 5 M. The stripping solution is usually nitric acid. The hydroxylamine salt is advantageously selected from the group constituted by nitraate, formiate, acetate and hydroxylamine propionate.

Use of hydroxylamine in the form of a nitrate or of a formiate has the advantage of avoiding the introduction of an anion which is foreign to the system.

In accordance with the invention, the reducing action of hydroxylamine is advantageously combined with the complexing and displacing action of formic acid.

In fact, it is known that the reaction involving reduction of Pu(IV) by hydroxylamine, namely:

$$2NH_2OH + 4\ Pu^{4+} \rightleftarrows 4\ Pu^{3+} + N_2O + H_2O + 4H^+$$

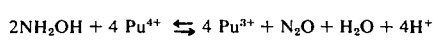

takes place at a high speed only at a low value of acidity. In point of fact, a medium which has a low acid concentration promotes hydrolysis, polymerization and precipitation of plutonium. On the other hand, the presence of formic acid having a concentration in the range of 1M and 5M in the reaction medium circumvents these disadvantages: in the first place, formic acid in fact makes it possible to maintain a weakly acid medium since it is a weak acid and, in the second place, the $HCOO^-$ ions retard the precipitation of Pu(IV) while complexing this latter and allowing it to pass into the aqueous phase. By producing a substantial displacement of the plutonium-IV from the organic phase to the aqueous phase, formic acid serves to accelerate the reaction. In fact, hydroxylamine which is insoluble in the organic phase is capable of reducing only the small fraction of Pu(IV) which is present in the aqueous phase.

Thus in the method according to the invention, when the concentration of formic acid in the reaction medium is within the range of 1M to 5M, the Pu(IV) is caused by said acid to pass from the organic phase into the aqueous phase as a result of complexing and displacement and is reduced to Pu(III) by the hydroxylamine in said aqueous phase.

The accompanying FIG. 1 shows the important part played by formic acid in this stripping process. This figure represents the partition isotherms of plutonium-IV contained in 20 % trilaurylamine in Solgil 54 B (tert-butyl benzene) in a 0.1N nitric acid medium. It is apparent from this figure that the presence of formic acid reduces the quantity of Pu(IV) in organic phase to a considerable extent.

Figure 2:
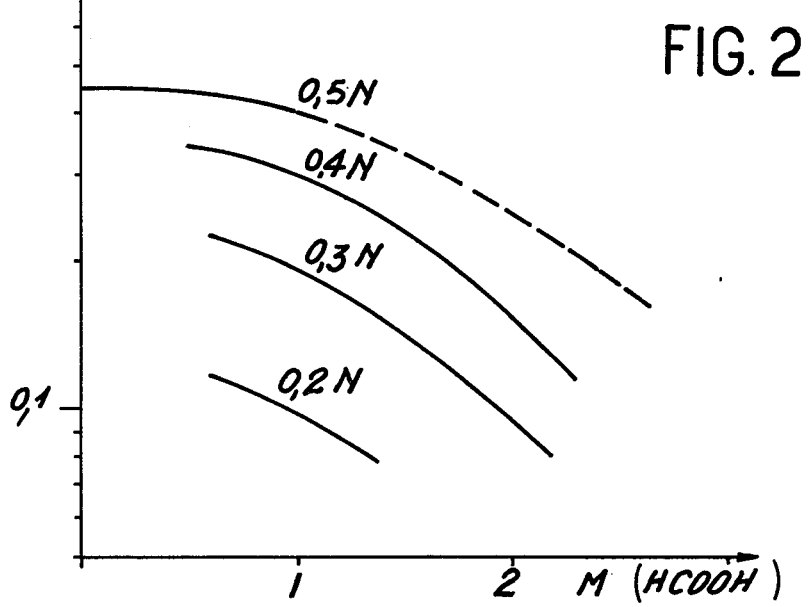

The accompanying FIG. 2 also shows the influence of the action of formic acid on the stripping of plutonium contained in 30 % tributylphosphate in dodecane. This figure gives in respect of different nitric acid media the curves of the coefficient of distribution $D_a^0$ of plutonium between the organic phase and the aqueous phase as a function of concentration of the formic acid which is employed. It can clearly be seen that this coefficient of distribution decreases as a function of the concentration of formic acid and therefore that said acid is conducive to good stripping of the plutonium.

In the case of organic solvents which contain both uranium and plutonium, the combined action of formic acid and hydroxylamine is particularly advantageous.

In fact, uranium-VI exhibits little response to the complexing action of formic acid and plutonium-IV can much more readily be reduced by hydroxylamine than uranium-VI. Good uranium-plutonium separation is thus achieved.

The solutions of plutonium obtained by means of the method according to the invention contain plutonium in the valence state III, formic acid and hydroxylamine. Simple boiling in the presence of nitric acid results in destruction of the formic acid and the hydroxylamine as well as re-oxidation of Pu(III) to Pu(IV) and concentration of this latter. If a continuous operation is performed in a 5N $HNO_3$ medium, practically no Pu(VI) is formed. The plutonium solutions derived from this treatment are therefore ready to undergo a further extraction cycle or a conventional precipitation by addition of oxalic acid, no further undesirable impurity having been introduced therein.

It should be noted that, in accordance with the invention, consideration can be given to the use of a stripping solution constituted by a mixture of hydrazine and formic acid. Hydrazine suffers from a disadvantage, however, in that it is a slower reductant than hydroxylamine and gives rise to the formation of unstable hydrazoic acid.

The method according to the invention can be carried out in any device for contacting two phases in countercurrent flow, for example in banks of mixer-settlers of known type such as those described in U.S. Pat. No. 3,692,494 and in British Pat. No. 1,268,332 in the name of the present applicant.

Three examples of application of the method according to the invention are given hereinafter without any implied limitation. Example 1 relates to stripping of plutonium from a solvent containing plutonium alone. Example 2 relates to stripping of plutonium from a solvent having a high plutonium content and a low uranium content. Examples 3 and 4 relate to stripping of plutonium from a solvent which has a high uranium content and a low plutonium content.

EXAMPLE 1

It is desired to strip plutonium from a solvent constituted by 20 % trilaurylamine in Solgil 54 B which has previously been loaded with 16 g.l$^{-1}$ of plutonium by contacting with a nitric acid solution of this element.

Figure 3:
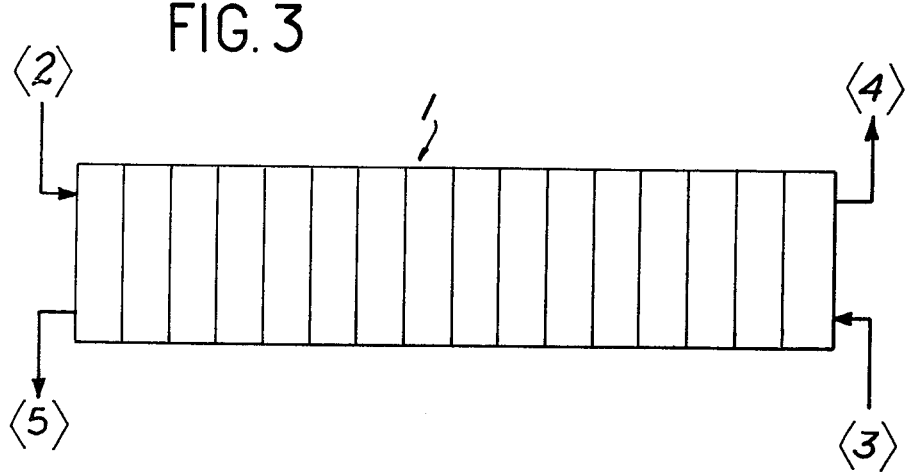

Stripping is carried out in the bank 1 of mixer-settlers as illustrated diagrammatically in the accompanying FIG. 3. The bank is made up of sixteen stages.

The plutonium-loaded solvent has the following composition:

{0.32M trilaurylamine — Solgil 54 B
{0.066M Pu(NO$_3$)$_4$
{0.07M HNO$_3$

The solvent is introduced into the bank of mixer-settlers 1 at 2, at a volume rate of flow of 2.5 V (V being a reference volume which has been established at the outset).

A solution having the following composition:

{2M HCOOH
{0.35M NH$_2$ OH.HNO$_3$
{0.1N HNO$_3$ is introduced at 3, at a volume rate of flow of 1 V.

The ratio of throughputs of the aqueous phase to the organic phase is 0.4 and the residence time of each phase within each stage of the bank of mixer-settlers 1 is 10 minutes.

At the end of 100 hours of operation, a constant composition is obtained in each stage. At this point, the solvent withdrawn from the bank 1 at 4 contains only 0.3 mg. l$^{-1}$ of plutonium. The stripping efficiency is therefore 99.998 %.

The aqueous solution withdrawn from the bank 1 at 5 contains 40 g.l$^{-1}$ of plutonium with the following distribution: 15% Pu(IV) and 85 % Pu(III).

EXAMPLE 2

It is desired to strip plutonium from a solvent constituted by 30 % tributylphosphate in dodecane having a high plutonium content and a low uranium content.

Figure 4:
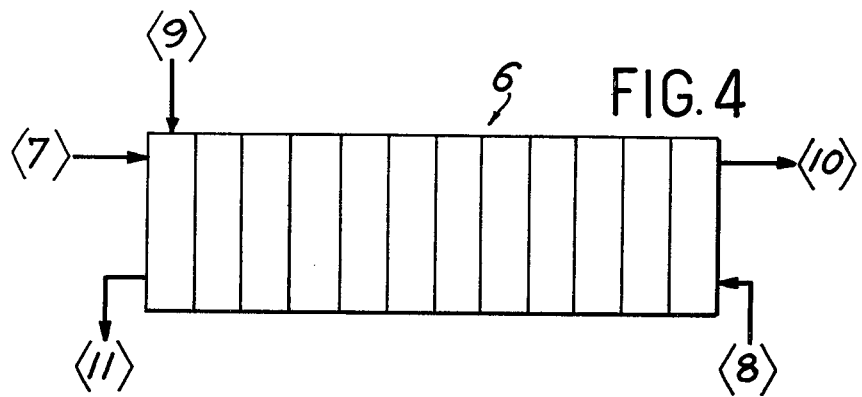

Stripping is carried out in a bank of mixer-settlers 6 as illustrated diagrammatically in the accompanying FIG. 4. This bank is made up of 12 stages.

The initial loaded organic solvent has the following composition:

{30 % TBP — dodecane
{0.1N HNO$_3$
{Pu : 18.3 g. l$^{-1}$
{U : 0.3 g. l$^{-1}$

The solvent is introduced into the bank 6 of mixer-settlers at 7, at a volume rate of flow of 1 V.

An aqueous solution having the composition:

{0.1N HNO$_3$
{0.6M NH$_2$OH.HNO$_3$ is introduced at 8 at a flow rate of 0.4 V. A solution of 6M HCOOH is introduced at 9 at a flow rate of 0.125 V.

After obtaining the stationary state, the solvent withdrawn from the bank 6 at 10 has the following composition:

$\begin{cases} 30\ \%\ \text{TBP} - \text{dodecane} \\ \text{U}: 0.3\ \text{g.l}^{-1} \\ \text{Pu}: 0.5\ \text{mg.l}^{-1} \end{cases}$ and the aqueous solution withdrawn from the bank at 11 has the composition:

$\begin{cases} \text{Pu}: 35\ \text{g.l}^{-1} \\ \text{U}: 56\ \text{mg.l}^{-1} \end{cases}$ The uranium decontamination factor of the plutonium is 10.

EXAMPLE 3

It is desired to carry out the separation of uranium and plutonium contained in a solvent which is constituted by 30 % tributylphosphate in dodecane which has a high uranium content and a low plutonium content.

Figure 5:
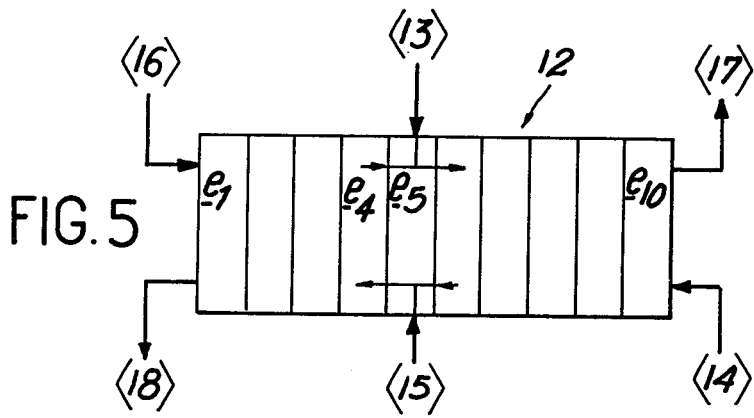

The strippng operation is performed in a bank of mixer-settlers 12 as shown diagrammatically in the accompanying FIG. 5. This bank consists of four washing stages (designated by the reference $e_1$ to $e_4$) and six stripping stages (designated by the references $e_5$ to $e_{10}$).

The initial loaded organic solvent has the following composition:

$\begin{cases} 30\ \%\ \text{TBP} - \text{dodecane} \\ 0.1\text{N HNO}_3 \\ \text{U}: 95\ \text{g.l}^{-1} \end{cases}$
Pu : 1.18 g.l$^{-1}$ The solvent is introduced into the stage $e_5$ of the bank 12 at 13, at a flow rate of 320 V.

An aqueous solution having the composition:

$\begin{cases} 0.1\text{N HNO}_3 \\ 0.4\text{M NH}_2\text{OH.HNO}_3 \end{cases}$ is introduced into the stage $e_{10}$ at 14 at a flow rate of 36 V. A solution having the composition:

$\begin{cases} 15\text{M HCOOH} \\ 0.6\text{M NH}_2\text{OH.HNO}_3 \end{cases}$ is introduced into the stage $e_5$ at 15, at a flow rate of 7.5 V.

A wash solution consisting of 30 % TBP in dodecane is introduced into the stage $e_1$ at 16, at a flow rate of 80 V.

After the stationary state has been obtained, the solvent delivered at 17 has the following composition:

$\begin{cases} 30\ \%\ \text{TBP} - \text{dodecane} \\ \text{U}: 76\ \text{g.l}^{-1} \\ \text{Pu}: 0.7\ \text{mg.l}^{-1} \end{cases}$ The aqueous solution which is delivered at 18 contains 8.7 g.l$^{-1}$ of Pu$^{3+}$ and 8 mg.l$^{-1}$ of U.

the plutonium decontamination factor of uranium is therefore $1.3 \times 10^3$ and the uranium decontamination factor of plutonium is $8.8 \times 10^4$.

EXAMPLE 4

It is desired to carry out the separation of uranium and plutonium contained in a solvent consisting of 30 % tributylphosphate in dodecane.

Figure 6:
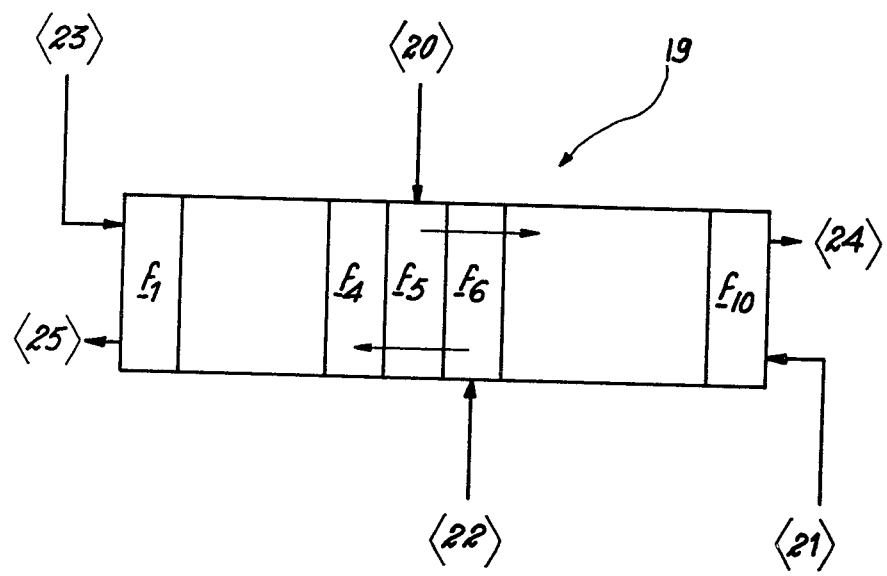

Partition is carried out in a bank of mixer-settlers 19 shown diagrammatically in the accompanying FIG. 6. This bank is made up of four washing stages designated by the references $f_1$ to $f_4$ and six stripping stages designated by the references $f_5$ to $f_{10}$.

The initial loaded organic solvent has the following composition:

$\begin{cases} 30\ \%\ \text{TBP} - \text{dodecane} \\ 0.1\text{N HNO}_3 \\ \text{U}: 100\ \text{g/l} \\ \text{Pu}: 1\ \text{g/l} \end{cases}$ Said solvent is introduced at 20 into the stage $f_5$ of the bank 19 at a flow rate of 10 V.

An aqueous solution having the composition:

$\begin{cases} 0.2\text{M HNO}_3 \\ 0.5\text{M NH}_2\text{OH.HNO}_3 \end{cases}$ is introduced into the stage $f_{10}$ at 21, at a flow rate of 1.03 V.

A solution having the composition:

$\begin{cases} 8\text{M HCOOH} \\ 1\text{M NH}_2\text{OH.HCOOH} \end{cases}$ is introduced into the stage $f_6$ at 22, at a flow rate of 0.375 V.

A wash solution consisting of 30 % TBP in dodecane is introduced into the stage $f_1$ at 23, at a flow rate of 2.5 V.

After obtaining the stationary state, the solvent delivered at 24 has the following composition:

$\begin{cases} 30\ \%\ \text{TBP} - \text{dodecane} \\ \text{U}: 80\ \text{g.l}^{-1} \\ \text{Pu}: 0.04\ \text{mg.l}^{-1} \\ 0.15\text{M HCOOH} \end{cases}$ The aqueous solution delivered at 25 contains 7.1 g.l$^{-1}$ of Pu and 15 mg.l$^{-1}$ of uranium.

The plutonium decontamination factor of uranium is therefore $2 \times 10^4$ and the uranium decontamination factor of plutonium is $5 \times 10^4$.

The examples given in the foregoing show that the method in accordance with the invention makes it possible to obtain good stripping of plutonium as well as good uranium-plutonium separation when the need arises. This method offers a further advantage in that the reagents employed (formic acid and hydroxylamine) are usual reagents and can readily be eliminated on completion of the stripping operation.

What we claim is:

1. A method of selective stripping of plutonium from an organic solvent loaded with plutonium comprises countercurrently contacting said organic solvent loaded with plutonium with an aqueous stripping solution containing a salt of hydroxylamine and formic acid, the concentration of the formic acid in the reaction medium being within the range of 1M to 5M.

2. A method according to claim 1, wherein the stripping solution contains nitric acid.

3. A method according to claim 1, wherein the hydroxylamine salt is nitrate, formiate, acetate or propionate.

4. A method according to claim 1, wherein the aromatic hydrocarbon is tert-butyl benzene.

5. A method according to claim 1, wherein said organic solvent comprises trilaurylamine diluted in an aromatic hydrocarbon.

6. A method according to claim 1 wherein said organic solvent loaded with plutonium also contains uranium.

7. A method according to claim 6 wherein the organic solvent comprises tributylphosphate diluted in an aliphatic hydrocarbon.

8. A method according to claim 7, wherein the aliphatic hydrocarbon is dodecane.

\* \* \* \* \*